(12) United States Patent
Branover et al.

(10) Patent No.: US 7,856,562 B2
(45) Date of Patent: Dec. 21, 2010

(54) SELECTIVE DEACTIVATION OF PROCESSOR CORES IN MULTIPLE PROCESSOR CORE SYSTEMS

(75) Inventors: Alexander Branover, Brookline, MA (US); Maurice Steinman, Marlborough, MA (US); Frank Helms, Austin, TX (US); Bill K. C. Kwan, Austin, TX (US); W. Kurt Lewchuk, Austin, TX (US); Paul Mackey, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 892 days.

(21) Appl. No.: 11/743,341

(22) Filed: May 2, 2007

(65) Prior Publication Data

US 2008/0276026 A1 Nov. 6, 2008

(51) Int. Cl.
*G06F 1/26* (2006.01)
(52) U.S. Cl. ..................... 713/300; 713/320
(58) Field of Classification Search ............. 713/300, 713/320
See application file for complete search history.

(56) References Cited

U.S. PATENT DOCUMENTS

| | | | |
|---|---|---|---|
| 4,891,810 A | 1/1990 | de Corlieu et al. | |
| 5,142,684 A * | 8/1992 | Perry et al. | 713/320 |
| 5,596,759 A | 1/1997 | Miller et al. | |
| 5,677,849 A | 10/1997 | Smith | |
| 6,067,633 A | 5/2000 | Robbins et al. | |
| 6,141,762 A * | 10/2000 | Nicol et al. | 713/300 |
| 6,327,663 B2 * | 12/2001 | Isaac et al. | 713/300 |
| 6,496,881 B1 | 12/2002 | Green et al. | |
| 6,625,559 B1 | 9/2003 | Helder | |
| 6,675,304 B1 * | 1/2004 | Pole et al. | 713/322 |
| 6,704,880 B2 * | 3/2004 | Dai et al. | 713/323 |
| 6,711,691 B1 * | 3/2004 | Howard et al. | 713/300 |
| 6,748,545 B1 * | 6/2004 | Helms | 713/300 |
| 6,823,465 B2 * | 11/2004 | Zhang | 713/300 |
| 6,920,572 B2 | 7/2005 | Nguyen et al. | |
| 6,931,559 B2 | 8/2005 | Burns et al. | |
| 7,017,074 B2 | 3/2006 | Okin | |
| 7,051,242 B2 | 5/2006 | Naffziger | |
| 7,174,467 B1 * | 2/2007 | Helms et al. | 713/300 |
| 7,260,731 B1 * | 8/2007 | Read et al. | 713/320 |
| 7,337,335 B2 * | 2/2008 | Jorgenson et al. | 713/300 |
| 7,624,291 B2 * | 11/2009 | Nguyen | 713/320 |

\* cited by examiner

*Primary Examiner*—Chun Cao

(57) ABSTRACT

A method includes applying a voltage to a first processor core of a plurality of processor cores to deactivate the first processor core, the voltage less than a retention voltage of the first processor core. The application of the voltage can be in response to a software setting. The software setting can be configured via a user input, a software application, an operating system, or a BIOS setting. Alternately, the application of the voltage can be in response to a permanent hardware setting, such as the state of a fuse associated with the first processor core.

18 Claims, 3 Drawing Sheets

SELECTIVE DEACTIVATION OF PROCESSOR CORES IN MULTIPLE PROCESSOR CORE SYSTEMS

FIELD OF THE DISCLOSURE

The present disclosure relates generally to processing systems and more particularly to managing multiple processor cores in processing systems.

BACKGROUND

The use of multiple processor cores in a processing system facilitates efficient computation and efficient use of shared resources. However, due to manufacturing defect, one or more of the processor cores may be permanently deactivated. Conventional techniques for deactivating a processor core typically involve initializing all of the processing cores of a system during a start up sequence, and then applying a boot (or start-up) voltage to the deactivated processor core while a normal operating voltage is applied to the remaining activated processor cores. A boot voltage is sufficient to permit a processor core to perform basic operations, such as basic input/ output system (BIOS) initialization, and execute at least a subset of instruction types. However, while the boot voltage typically is lower than the normal operating voltage and therefore can decrease power consumed by a deactivated processor core, the boot voltage typically causes significant leakage current at the transistors and other circuit components of the deactivated processor core, thereby resulting in continuing power consumption by the processor core even though it has been deactivated. Accordingly, an improved technique for deactivating processor cores would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-6 illustrate example techniques for selectively activating and deactivating a processor core. In response to identifying a processor core to be deactivated, the voltage applied to the identified processor core (i.e., the voltage difference between the processor core's voltage inputs) is reduced to a level less than the retention voltage of the processor core, wherein the retention voltage is a reduced voltage at which the transistors of the processor core are able to maintain their silicon state but the processor core is unable to perform even basic operations or reliably execute instructions. In one embodiment, the voltage applied to the identified processor core is approximately zero (0) volts (V). The application of zero volts or a voltage less than the retention voltage can reduce leakage current in the identified processor core compared to conventional deactivation techniques whereby a boot voltage or a normal operational voltage is applied.

The application of the substantially reduced voltage or zero voltage to the identified processor core can be achieved by, for example, configuring a voltage controller to provide the reduced voltage or zero voltage or by tying one voltage input of the identified processor core to the other voltage input or by tying both voltage inputs to the same voltage reference (e.g., ground) such that the voltage difference between the voltage inputs of the processor core is approximately zero (approximately zero due to the relatively small voltage drops across the transistors or other circuit components used to tie the two voltage inputs together). Further, other deactivation processes may be performed for the identified processor core, such as by clock gating the processor core or otherwise reducing the frequency of the clock input to the processor core.

A processor core can be identified for deactivation in a variety of manners. In one embodiment, the processor core can be identified as defective during manufacturing or testing and thus can be permanently deactivated so as to prevent erroneous operation. In another embodiment, the processor core can be identified for temporary deactivation through a software setting configurable by a user (e.g., via an input to an application, a control interface, a switch, or the operating system), via an operating system process, during a start-up configuration (e.g., via the BIOS), or by another software application.

Figure 1:
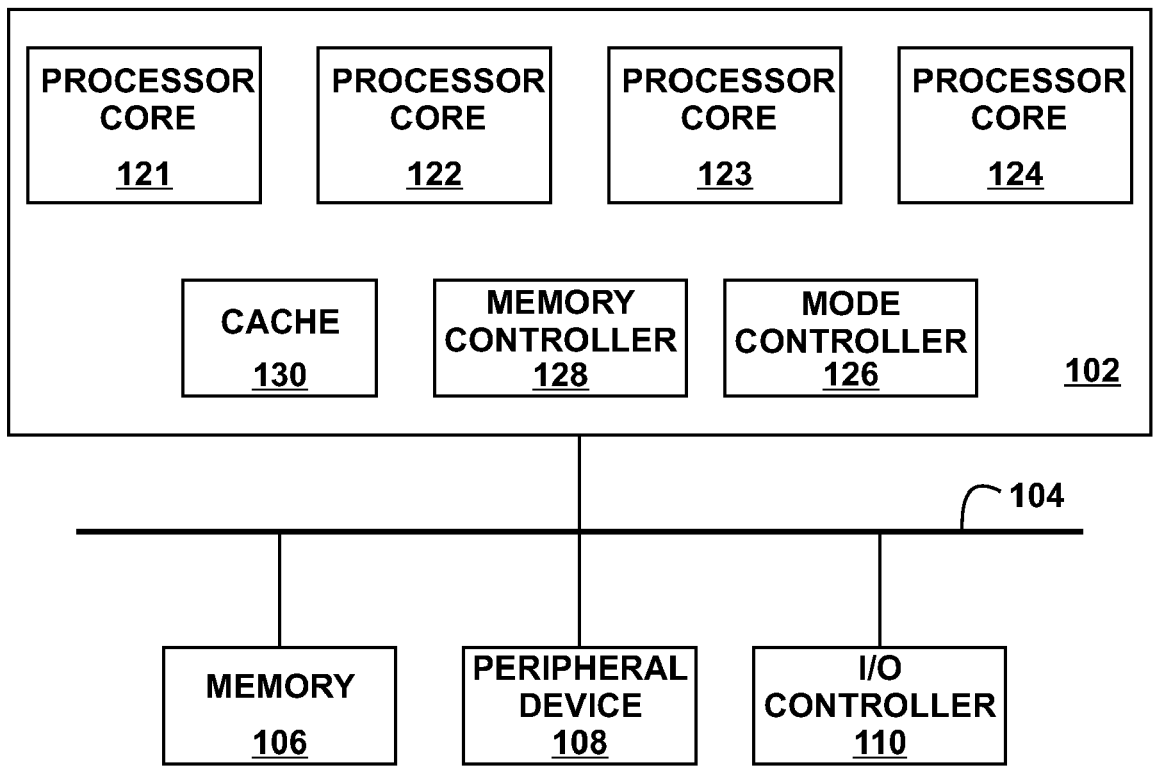
FIG. 1 is a diagram illustrating a multiple processor core system in accordance with at least one embodiment of the present disclosure.

FIG. 1 illustrates a processing system 100 having multiple processor cores in accordance with at least one embodiment of the present disclosure. In the depicted example, the processing system 100 includes a processor device 102 and a plurality of peripheral devices that interact with the processor device 102 via one or more busses 104 or other interconnects. The peripheral devices can include, for example, a memory 106 (e.g., a random access memory), a peripheral device 108 (e.g., a memory controller, a bus interface, etc.), and an input/ output (I/O) controller 110 to interface with other devices. In at least one embodiment, the processor device 102 is implemented as an integrated circuit package, such as, for example, a microprocessor, a microcontroller, an application specific integrated circuit (ASIC), and the like.

The processor device 102 includes a plurality of processor cores (four processor cores 121-124 in the illustrated example), a mode controller 126 and one or more other resources with which the processor cores interact, including, for example, a memory controller 128, a cache 130, and the like. The mode controller 126 can be configured as hardware (e.g., logic or a state machine), software, firmware, or combinations thereof. The processor cores 121-124 each includes an instruction pipeline to execute instructions, wherein the instruction pipeline can include instruction fetch logic, instruction decode logic, dispatch logic, one or more arithmetic logic units (ALUs), one or more floating point units (FPUs), and the like.

As described in greater detail herein, each of the processor cores 121-124 includes a first voltage input and a second voltage input, whereby each of the processor cores 121-124 is powered by a voltage applied between their respective first and second voltage inputs. The mode controller 126, in one embodiment, is configured to identify those of the processor cores 121-124 to be deactivated and those to be activated and deactivate and activate each of the identified processor cores accordingly by configuring the application of a voltage to each of the processor cores 121-124. In one embodiment, the mode controller 126 deactivates an identified processor core by configuring the application of a voltage less than the retention voltage of the processor core, such as the application of zero volts. Further, in deactivating a processor core, the mode controller 126 can clock gate the processor core or otherwise supply a reduced frequency clock signal prior to, during, or after applying the deactivation-level voltage. Conversely, the mode controller 126 activates an identified processor core by configuring the application of a voltage greater than the retention voltage of the processor core, such as a normal operating voltage wherein instructions can be reliably executed at normal clock speeds. Further, the mode controller 126 can configure the provision of a clock signal having an operational frequency to the identified processor core while activated.

Figure 2:
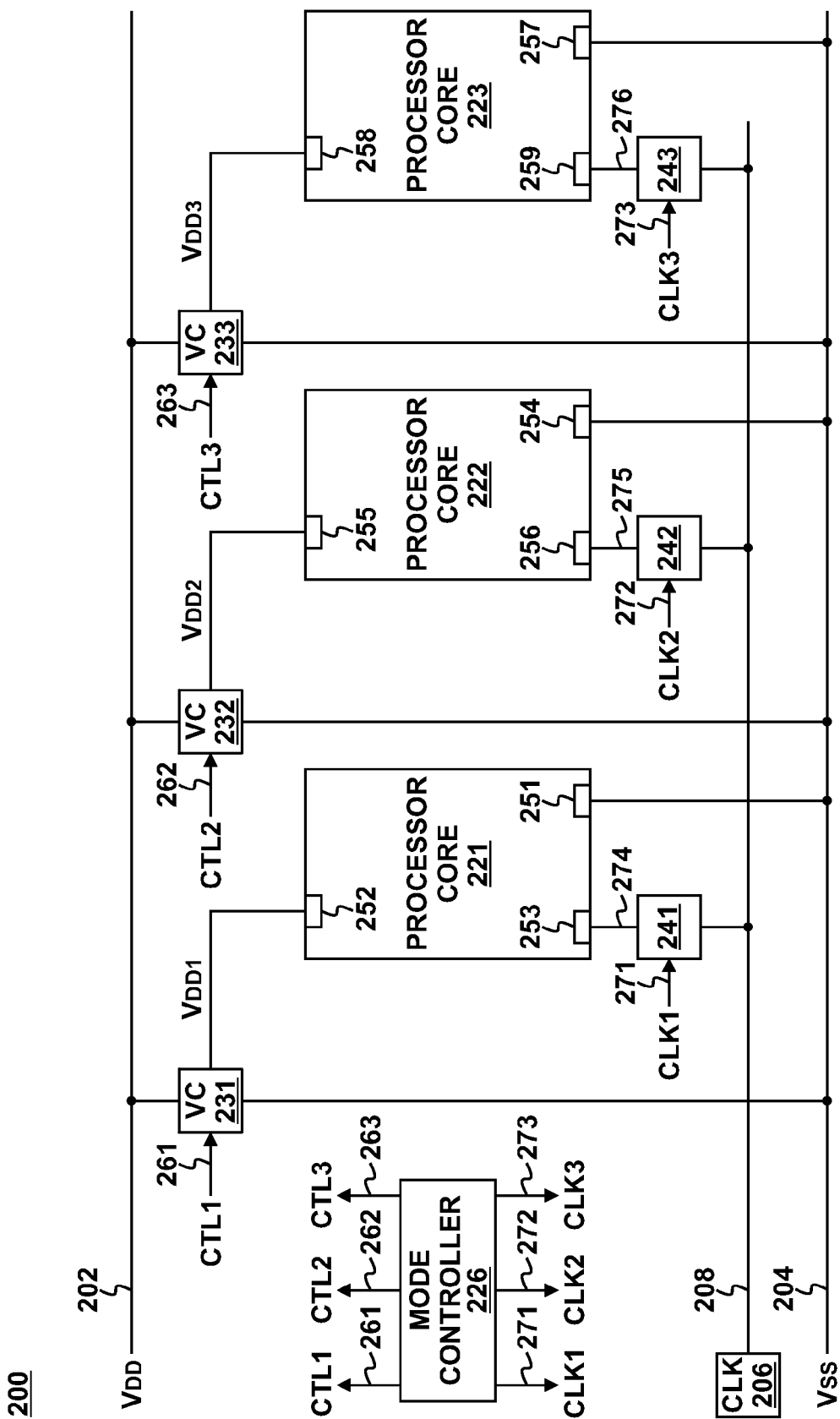
FIG. 2 is a diagram illustrating a processor device having multiple processor cores that can be selectively activated or deactivated in accordance with at least one embodiment of the present disclosure.

FIG. 2 illustrates a processor device 200 having a plurality of processor cores in accordance with at least one embodiment of the present disclosure. In one embodiment, the processor device 200 is a particular implementation of the processor device 100 of FIG. 1. In the depicted example, the processor device 200 includes a voltage reference 202 (e.g., a voltage rail or voltage plane) to provide a voltage $V_{DD}$, a voltage reference 204 to provide a voltage $V_{SS}$, a clock source 206 to provide a clock signal via a clock reference 208, a plurality of processor cores 221-223, and a mode controller 226. The processor device 200 further includes voltage controllers (VCs) 231-233 and clock controllers 241-243, each VC and clock controller corresponding to a respective one of the processor cores 221-223.

In the depicted implementation, the processor core 221 includes a voltage input 251 connected to the voltage reference 204 to receive the voltage $V_{SS}$ and a voltage input 252 to receive a voltage $V_{DD1}$ such that the voltage $V_{221}$ applied to the processor core 221 is the difference between $V_{DD1}$ and $V_{SS}$ ($V_{221}=V_{DD1}-V_{SS}$). Further, the processor core 221 includes a clock input 253 to receive a clock signal output by the clock controller 241. The processor core 222 includes a voltage input 254 connected to the voltage reference 204 to receive the voltage $V_{SS}$ and a voltage input 255 to receive a voltage $V_{DD2}$ such that the voltage $V_{222}$ applied to the processor core 222 is the difference between $V_{DD2}$ and $V_{SS}$ ($V_{222}=V_{DD2}-V_{SS}$). The processor core 222 also includes a clock input 256 to receive a clock signal output by the clock controller 242. Likewise, the processor core 223 includes a voltage input 257 connected to the voltage reference 204 to receive the voltage $V_{SS}$ and a voltage input 258 to receive a voltage $V_{DD3}$ such that the voltage $V_{223}$ applied to the processor core 223 is the difference between $V_{DD3}$ and $V_{SS}$ ($V_{223}=V_{DD3}-V_{SS}$). The processor core 223 also includes a clock input 259 to receive a clock signal output by the clock controller 243.

Each of the voltage controllers 231-233 is configured to control the voltage $V_{DDX}$ provided to a voltage input of a corresponding one of the processor cores 221-223. The voltage controller 231 includes an input connected to the voltage reference 202 to receive the voltage $V_{DD}$, an input connected to the voltage reference 204 to receive the voltage $V_{SS}$, an input to receive a control signal 261 (also labeled "CTL1" in FIG. 2), and an output to provide the voltage $V_{DD1}$ based on the control signal 261. The voltage controller 232 includes an input connected to the voltage reference 202 to receive the voltage $V_{DD}$, an input connected to the voltage reference 204 to receive the voltage $V_{SS}$, an input to receive a control signal 262 (also labeled "CTL2" in FIG. 2), and an output to provide the voltage $V_{DD2}$ based on the control signal 262. The voltage controller 233 includes an input connected to the voltage reference 202 to receive the voltage $V_{DD}$, an input connected to the voltage reference 204 to receive the voltage $V_{SS}$, an input to receive a control signal 263 (also labeled "CTL3" in FIG. 2), and an output to provide the voltage $V_{DD3}$ based on the control signal 263.

Figure 3:
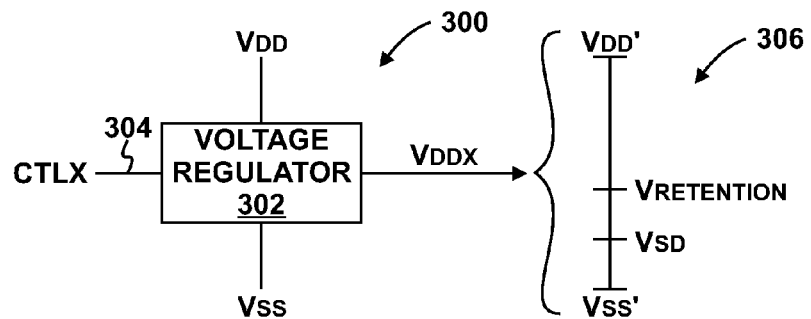
FIG. 3 is diagram illustrating an example voltage regulator for providing an adjustable voltage to a processor core in accordance with at least one embodiment of the present disclosure.
Figure 4:
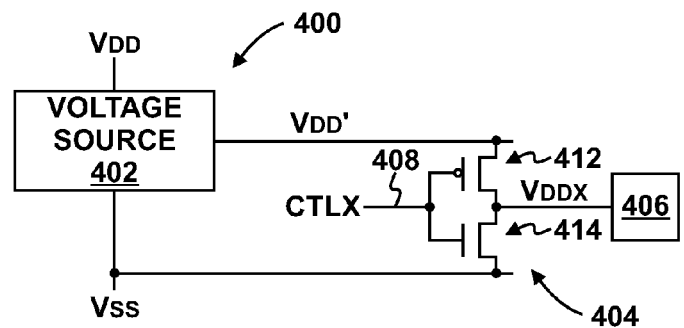
FIG. 4 is a diagram illustrating another example voltage controller for deactivating a processor core in accordance with at least one embodiment of the present disclosure.

In one embodiment, each of the voltage controllers 231-233 includes a voltage regulator configured to provide an adjustable voltage $V_{DDX}$ in response to the input control signal, whereby the voltage regulator is configurable to output a voltage $V_{DDX}$ such that the voltage difference $V_{DDX}-V_{SS}$ is less than the retention voltage of the processor cores 221-223. In this instance, the control signal input to the voltage controller can be a multiple bit value representing the voltage level to be output by the voltage controller, wherein the voltage controller is configured by the multiple bit value to provide the corresponding voltage level. Alternately, the voltage controller can be configured to provide two voltages, a normal operating voltage and a deactivate-level voltage lower than the retention voltage. In this instance, the control signal can be a single bit value whereby one bit value (e.g., a logic "0") corresponds to one voltage level and the other bit value (e.g., a logic "1") corresponds to the other voltage level. FIG. 3 illustrates a particular implementation of an adjustable voltage regulator implementation. In another embodiment, each of the voltage controllers 231-233 includes a switch or other logic configurable to selectively connect a voltage input of the corresponding processor core to a select one of an output of a voltage regulator or another voltage source or to the voltage reference 204. When the output of the voltage controller is connected to the voltage reference 204, the output voltage $V_{DDX}$ is substantially equal to $V_{SS}$ and thus the voltage applied to the corresponding processor core is substantially zero volts. FIG. 4 illustrates a particular embodiment of this switch implementation.

Each of the clock controllers 241-243 is configured to alter the clock signal provided via the clock reference 208 in response to a control signal. The clock controller 241 includes an input connected to the clock reference 208 to receive the clock signal output by the clock source 206, an input to receive a control signal 271 (also labeled "CLK1" in FIG. 2), and an output to provide a modified clock signal 274 to the clock input 253 of the processor core 221, wherein the frequency of the modified clock signal 274 is based on the control signal 271. The clock controller 242 includes an input connected to the clock reference 208 to receive the clock signal output by the clock source 206, an input to receive a control signal 272 (also labeled "CLK2" in FIG. 2), and an output to provide a modified clock signal 275 to the clock input 256 of the processor core 222, wherein the frequency of the modified clock signal 275 is based on the control signal 272. The clock controller 243 includes an input connected to the clock reference 208 to receive the clock signal output by the clock source 206, an input to receive a control signal 273 (also labeled "CLK3" in FIG. 2), and an output to provide a modified clock signal 276 to the clock input 259 of the processor core 223, wherein the frequency of the modified clock signal 276 is based on the control signal 273.

In one embodiment, each of the clock controllers 241-243 includes circuitry to provide a modified clock signal based on the input clock signal. The circuitry can include, for example, a phase-locked loop, a frequency divider, a transmission gate, and the like. When the corresponding processor core is in a normal operation mode, the modified clock signal may be substantially equivalent in frequency to the input clock signal. However, when the corresponding processor core is in a deactivated mode, the modified clock signal may have a frequency less than the input clock signal or the input clock signal may be clock gated by the clock controller.

The mode controller 226, in one embodiment, is configured to identify which of the processor cores 221-223 are to be deactivated and which are to be activated and configure the control signals 261-263 and 271-273 accordingly to affect the corresponding activations and deactivations. For a processor core to be deactivated, if any, the mode controller 226 configures the corresponding one of control signals 261-263 so as to configure the corresponding voltage controller to output a voltage for $V_{DDX}$ that results in the application of a voltage to the processor core that is substantially zero volts, or at least less than the retention voltage of the processor core. Further, the mode controller 226 configures the corresponding one of control signals 271-273 so as to configure the corresponding clock controller to clock gate the processor core or alternately provide a lower frequency clock signal to the processor core. In one embodiment, to prevent spurious operations the mode controller 226 initiates the clock gating of a deactivated processor core prior to reducing its applied voltage to a level at or below the retention voltage.

Conversely, for a processor core to be activated, the mode controller 226 configures the corresponding one of control signals 261-263 so as to configure the corresponding voltage controller to output a voltage for $V_{DDX}$ that results in the application of a voltage to the processor core that is greater than the retention voltage of the processor core. Additionally, the mode controller 226 configures the corresponding one of control signals 271-273 so as to configure the corresponding clock controller to provide a normal frequency clock signal to the processor core.

As described in greater detail with reference to FIG. 5, the mode controller 226 can be configured via a hardware or software setting, such as via a basic input/output system (BIOS) of the processor device 200, via a user input (through a software application, a switch, and the like), or via the operating system (OS) of the processor device 200. Thus, one or more of the processor cores 222-223 can be temporarily deactivated based on user input, a BIOS setting, or under OS control. Alternately, as described with respect to FIG. 6, the mode controller 226 can be configured to permanently deactivate a processor core based on a fuse array or a write-once register that is set during, for example, the manufacturing/testing process.

FIG. 3 illustrates an example implementation of a voltage controller 300 in accordance with at least one embodiment of the present disclosure. In one embodiment, the voltage controller 300 corresponds to the voltage controllers 231-233 of FIG. 2. As shown, the voltage controller 300 can include a voltage regulator 302 having an input to receive the voltage $V_{DD}$, an input to receive the voltage $V_{SS}$, an input to receive a control signal 304 (also labeled "CTLX" in FIG. 3), and an output to provide a voltage $V_{DDX}$ that is adjustable based on the control signal 304. As illustrated by voltage chart 306, the voltage regulator 302 can configure the voltage $V_{DDX}$ in a range of $V_{SS}$, to $V_{DD}$. As further shown, the voltage regulator 302 is configurable provide a level for voltage $V_{DDX}$ such that the voltage difference $V_{DDX}-V_{SS}$ is less than the retention voltage of the processor cores 221-223 (this voltage is referred to herein as "the shut down voltage" or $V_{SD}$). The shut down voltage $V_{SD}$, in one embodiment, is substantially equal to the voltage $V_{SS}$.

In one embodiment, the voltage regulator 302 is configurable to provide more than two voltage levels and the control signal 304 therefore can be a multiple bit value representing the voltage level to be output by the voltage controller 302. To illustrate, a bit value "00" could correspond to the voltage $V_{SD}$, a bit value "01" corresponds to the retention voltage $V_{retention}$, and a bit value "10" corresponds to the normal operating voltage $V_{DD}$. Alternately, the voltage controller 302 can be configured to provide two voltages, a normal operating voltage $V_{DD}$, and the shut down voltage $V_{SD}$. In this instance, the control signal 304 can be a single bit value whereby one bit value (e.g., a logic "0") corresponds to one voltage level and the other bit value (e.g., a logic "1") corresponds to the other voltage level.

FIG. 4 illustrates an alternate voltage controller 400 in accordance with at least one embodiment of the present disclosure. In one embodiment, the voltage controller 400 corresponds to the voltage controllers 231-233 of FIG. 2. The voltage controller 400 includes a voltage source 402 to provide a voltage $V_{DD}$, and a switch 404 configured to selectively connect the voltage input 406 (corresponding to voltage inputs 252, 255 or 258 of FIG. 2) of a processor core to either the voltage $V_{DD}$, or the voltage $V_{SS}$. In the depicted example, the voltage source 402 includes an input connected to receive the voltage $V_{DD}$, and input to receive the voltage $V_{SS}$, and an output to provide the voltage $V_{DD}$. The voltage source 402 can include, for example, a voltage regulator, such as the voltage regulator 300 of FIG. 3. The voltage source 402 can be a voltage source that supplies the voltage $V_{DD}$ for a number of processor cores, or the voltage source 402 may correspond to a particular processor core.

The switch 404 includes an input connected to the output of the voltage source 402, an input to receive the voltage $V_{SS}$, an input to receive a control signal 408 (also labeled "CTLX"), and an output connected to the voltage input 406 to provide a select one of the voltage $V_{DD}$, or the voltage $V_{SS}$ based on the state of the control signal 408. In the illustrated example, the switch 404 includes a p-type transistor 412 and an n-type transistor 414 connected in series between the output of the voltage source 402 and the voltage reference 104 (FIG. 1). The p-type transistor 412 includes a first current electrode connected to the output of the voltage source 402, a second current electrode connected to the voltage input 406, and a control electrode (e.g., a gate electrode) to receive the control signal 408. The n-type transistor 414 includes a first current electrode connected to the voltage input 406, a second current electrode connected to the voltage reference 104, and a control electrode to receive the control signal 408.

When the control signal 408 is in a first state (e.g., a logic "0"), the switch 402 provides the voltage $V_{DD}$ at its output. Conversely, when the control signal 408 is in a second state (e.g., a logic "1"), the switch 402 provides the voltage $V_{SS}$ at its output. Thus, when the control signal 408 is in the second state (associated with deactivating the processor core), the switch 402 can tie the voltage input 406 of the processor core to $V_{SS}$, thereby effectively applying substantially zero volts to the processor core. Alternate implementations of the switch 404 can be implemented without departing from the scope of the present disclosure.

Figures 5, 6:
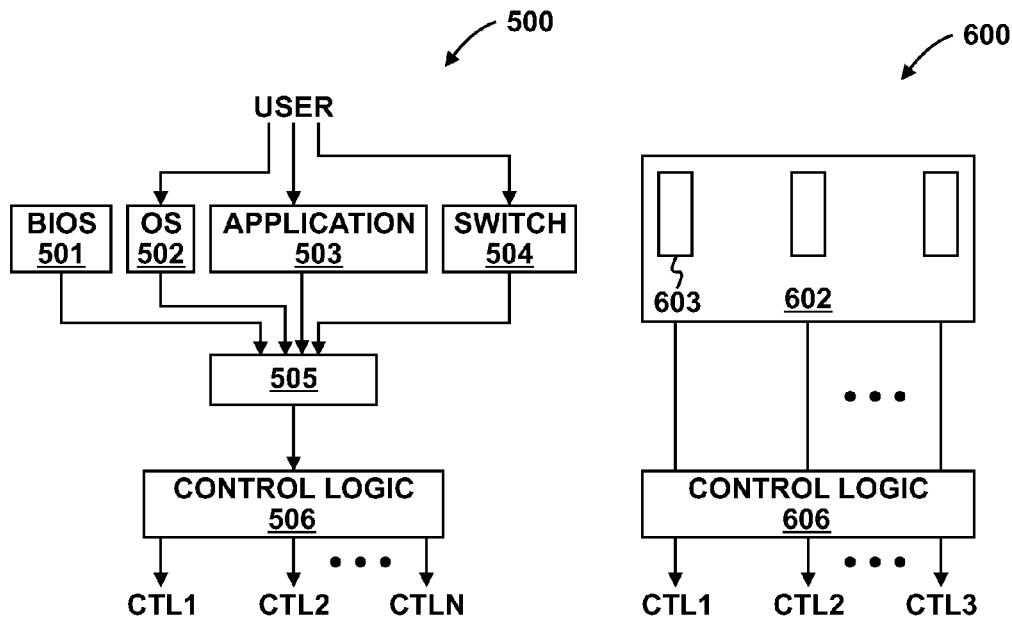
FIG. 5 is a diagram illustrating an example mode controller for selectively activating and deactivating processor cores in accordance with at least one embodiment of the present disclosure.
FIG. 6 is a diagram illustrating another example mode controller for selectively activating and deactivating processor cores in accordance with at least one embodiment of the present disclosure.

FIG. 5 illustrates a mode controller 500 in accordance with at least one embodiment of the present disclosure. In one embodiment, the mode controller 500 corresponds to the mode controller 126 of FIG. 1 or the mode controller 226 of FIG. 2. The mode controller 500 includes any of a plurality of control interface, such as a BIOS 500, an operating system 501, a software application 502, and a switch 503 (e.g., a toggle switch, a button, a slider switch, etc.). The switch 503 can include a hardware switch accessible to the user or a "soft" switch displayed on a display for manipulation by the user. The mode controller 500 further includes a configurable hardware setting mechanism, such as a control register 505 or a set of latches, and control logic 506. The control interfaces 501-504 receive processor core control information and store the processor core control information at the control register 505. The processor core control information can include, for example, information identifying which processor cores are to be activated and which are to be deactivated. To illustrate, for a particular hardware configuration, the BIOS can be set up to write a particular value to the control register 505, whereby the value identifies which processor cores are to be activated and which are to be deactivated. As another example, a user may be utilizing a multiple processor core system to perform relatively low-intensity tasks (such as, for example, a word processing document) and therefore may desire to conserve power. Thus, the user can provide an input via the operating system 502, the software application 503, or the switch 504 to direct the deactivation of one or more processor cores. Corresponding control information can be written to the control register 505 in response to the user input. Further, an OS may decide the number of processor cores to activate at any given time based on system resource usage and thus may write a corresponding value to the control register 505 to affect the selective disablement of processor cores. Thus, the processor cores can be temporarily deactivated per user or processing control. Conversely, when the OS or user desires to activate a deactivated processor core (e.g., when the user plans to initiate a higher-intensity use of the processing system), the user can manipulate the OS 502, the software application 403 or the switch 504 to reactivate one or more deactivated processor cores via processor control information written to the control register 505.

The control logic 506 includes an input connected to the control register 505 and a plurality of outputs to provide control signals (labeled "CTL1", "CTL2" and "CTLN" and corresponding to control signals 261-263 of FIG. 2) to affect the selective activating and deactivating of processor cores as indicated by the processor core control information stored in the control register 505. As discussed above, the control signals can be configured as multiple bit values so as to direct the output of one of three or more voltage levels to the corresponding processor core, or the control signals can be configured as a single bit to direct the output of either a normal operating voltage or a deactivating voltage. Accordingly, the control logic 506 can be configured to translate the value stored in the control register 505 into the corresponding single-bit or multiple-bit values of the control signals.

FIG. 6 illustrates another mode controller 600 in accordance with at least one embodiment of the present disclosure. In one embodiment, the mode controller 600 corresponds to the mode controller 126 of FIG. 1 or the mode controller 226 of FIG. 2. The mode controller 600 includes a fuse array 602 and control logic 606. The fuse array 602 includes, for example, a plurality of fuses 603, each fuse 603 associated with a corresponding one of a plurality of processor cores. During the manufacture or testing of a processor device, processor cores having defects are identified and the corresponding fuses are blown. The control logic 606 includes an input connected to the fuses of the fuse array 600 and a plurality of outputs to provide control signals (labeled "CTL1", "CTL2" and "CTLN" and corresponding to control signals 261-263 of FIG. 2) to affect the selective activating and deactivating of processor cores as indicated by the blown/not-blown state of the corresponding fuses of the fuse array 602. To illustrate, if a blown fuse indicates the corresponding processor core is to be deactivated, the control logic 606 can configure the corresponding control signal such that a deactivation voltage is applied to the processor core associated with a blown fuse. Thus, defective processor cores can be permanently deactivated via the fuse array 602.

In accordance with one aspect of the present disclosure, a method includes applying a first voltage to a first processor core of a plurality of processor cores to deactivate the first processor core, the first voltage less than a retention voltage of the first processor core. The application of the first voltage can be in response to a software setting. The software setting can be configured via a user input, a software application, an operating system, or a BIOS setting.

In accordance with another aspect of the present disclosure, a processor device includes a first voltage reference, a second voltage reference, and a plurality of processor cores including a first processor core. The first processor core includes a first voltage input and a second voltage input, the second voltage input coupled to the second voltage reference. The processor device further includes a voltage controller configured to selectively connect the first voltage input to a select one of the first voltage reference or the second voltage reference.

In accordance with yet another aspect of the present disclosure, a processor device includes a first voltage reference, a second voltage reference, and a plurality of processor cores including a first processor core. the first processor core includes a first voltage input and a second voltage input, the second voltage input connected to the second voltage reference. The processor device further includes a voltage regulator including an input to receive a control signal and an output coupled to the first voltage input of the first processor core. The voltage regulator is configured to provide a first voltage at the output in response to the control signal having a first state and to provide a second voltage at the output in response to the control signal having a second state, the second voltage being less than a retention voltage of the first processor core.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
configuring a first voltage regulator to apply a first voltage to a first voltage input of a first processor core of a plurality of processor cores to deactivate the first processor core, the first processor core comprising the first voltage input and a second voltage input, the second voltage input connected to a voltage reference, and the first voltage less than a retention voltage of the first processor core and substantially equal to a voltage of the voltage reference.

2. The method of claim 1, further comprising:
applying a second voltage to a second processor core of the plurality of processor cores to activate the second processor core, the second voltage greater than a retention voltage of the second processor core.

3. The method of claim 1, wherein the first voltage comprises substantially zero volts.

4. The method of claim 1, wherein the first voltage regulator is to apply the first voltage to the first processor core to deactivate the first processor core in response to a software setting.

5. The method of claim 4, further comprising configuring the software setting via a user input.

6. The method of claim 5, wherein the user input comprises a manipulation of a switch by a user.

7. The method of claim 4, further comprising configuring the software setting via a software application.

8. A processor device comprising:
a first voltage reference;
a second voltage reference;
a plurality of processor cores including a first processor core, the first processor core comprising a first voltage input and a second voltage input, the second voltage input coupled to the second voltage reference;
a voltage controller configured to selectively connect the first voltage input to a select one of the first voltage reference or the second voltage reference; and
a mode controller to configure a control signal to have a first state in response to determining the first processor core is to be activated and to configure the control signal to have a second state in response to determining the first processor core is to be deactivated;
wherein the voltage controller comprises an receive the control signal, the voltage controller configured to connect the first voltage input to the first voltage reference in response to the control signal having the first state and to connect the first voltage input to the second voltage reference in response to the control signal having the second state.

9. The processor device of claim 8, wherein the mode controller is configured to determine whether to deactivate the first processor core based on a state of a fuse associated with the first processor core.

10. The processor device of claim 8, wherein the mode controller is configured to determine whether to deactivate the first processor core based on a software setting.

11. The processor device of claim 10, further comprising:
a user-manipulatable switch to configure the software setting.

12. A processor device comprising:
a first voltage reference;
a second voltage reference;
a plurality of processor cores including a first processor core, the first processor core comprising a first voltage input and a second voltage input, the second voltage input connected to the second voltage reference; and
a first voltage regulator comprising an input to receive a first control signal and an output coupled to the first voltage input of the first processor core, the first voltage regulator configured to provide a first voltage at the output in response to the first control signal having a first state and to provide a second voltage at the output in response to the first control signal having a second state, the second voltage less than a retention voltage of the first processor core.

13. The processor device of claim 12, wherein the plurality of processor cores includes a second processor core, the second processor core comprising a third voltage input and a fourth voltage input, the fourth voltage input coupled to the second voltage reference, the processor device further comprising:
a second voltage regulator comprising an input to receive a second control signal and an output coupled to the third voltage input of the second processor core, the second voltage regulator configured to provide the first voltage at the output in response to the second control signal having the first state and to provide the second voltage at the output in response to the second control signal having the second state.

14. The processor device of claim 12, further comprising:
a mode controller to configure the first control signal to have the first state in response to determining the first processor core is to be activated and to configure the first control signal to have the second state in response to determining the first processor core is to be deactivated.

15. The processor device of claim 14, wherein the mode controller is configured to determine whether to deactivate the first processor core based on a state of a fuse associated with the first processor core.

16. The processor device of claim 14, wherein the mode controller is configured to determine whether to deactivate the first processor core based on a software setting.

17. The processor device of claim 16, further comprising:
a user-manipulatable switch to configure the software setting.

18. The processor device of claim 8, wherein the mode controller is configured to determine whether to deactivate the first processor core based on a software setting settable via a software application.

* * * * *